US008891024B2

(12) United States Patent
Cruz et al.

(10) Patent No.: US 8,891,024 B2

(45) Date of Patent: Nov. 18, 2014

(54) REMOTE CONTROL WITH TV LISTING DISPLAY

(75) Inventors: Anthony Cruz, Port Deposit, MD (US); Gwendolyn Mahon Thaxter, Ridgefield, CT (US); Laszlo T. Erdely, Crofton, MD (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 644 days.

(21) Appl. No.: 13/189,619

(22) Filed: Jul. 25, 2011

(65) Prior Publication Data

US 2011/0283321 A1 Nov. 17, 2011

Related U.S. Application Data

(63) Continuation of application No. 11/693,784, filed on Mar. 30, 2007, now Pat. No. 8,026,983.

(51) Int. Cl.

*H04N 5/44* (2011.01)
*G08C 23/04* (2006.01)
*G08C 17/00* (2006.01)

(52) U.S. Cl.

CPC ................ *G08C 17/00* (2013.01); *G08C 23/04* (2013.01); *G08C 2201/50* (2013.01); *G08C 2201/92* (2013.01)

USPC .......................................................... 348/734

(58) Field of Classification Search

CPC .................................................... H04N 5/4403

USPC .......................................................... 348/734

See application file for complete search history.

(56) References Cited

U.S. PATENT DOCUMENTS

| | | | | |
|---|---|---|---|---|
| 2002/0188948 | A1 | 12/2002 | Florence | |
| 2003/0169234 | A1* | 9/2003 | Kempisty | 345/158 |
| 2003/0212708 | A1* | 11/2003 | Potrebic et al. | 707/104.1 |
| 2005/0080496 | A1 | 4/2005 | Hayes et al. | |
| 2005/0165918 | A1* | 7/2005 | Wantanabe et al. | 709/223 |
| 2005/0275758 | A1 | 12/2005 | McEvilly et al. | |
| 2007/0157221 | A1 | 7/2007 | Ou et al. | |
| 2007/0162938 | A1 | 7/2007 | Bennett et al. | |
| 2007/0186243 | A1 | 8/2007 | Pettit et al. | |
| 2007/0236613 | A1 | 10/2007 | Foss | |
| 2007/0250897 | A1 | 10/2007 | Pearson | |
| 2008/0046935 | A1 | 2/2008 | Krakirian | |
| 2008/0092161 | A1 | 4/2008 | Chen | |
| 2008/0148331 | A1 | 6/2008 | Walter et al. | |
| 2008/0244660 | A1 | 10/2008 | Wodka et al. | |
| 2008/0301729 | A1 | 12/2008 | Broos et al. | |
| 2010/0165217 | A1 | 7/2010 | Jacob | |

* cited by examiner

*Primary Examiner* — Hai Phan
*Assistant Examiner* — Zhen Y Wu

(57) ABSTRACT

A device includes a keypad that further includes first keys related to selecting television channels associated with a set top box and a second key related to requesting a television listing. The device further includes an infra-red transceiver that transmits a request for television listing information to a set top box based on user selection of the second key, and receives television listing data, from the set top box, that includes program information related to a plurality of channels over a period of time. The device also includes a color display unit that displays the television listing data.

20 Claims, 10 Drawing Sheets

REMOTE CONTROL WITH TV LISTING DISPLAY

RELATED APPLICATION

This application is a continuation of U.S. patent application Ser. No. 11/693,784, filed Mar. 30, 2007, the disclosure of which is incorporated by reference herein in its entirety.

BACKGROUND

Hand-held remote control devices have long been used to conveniently control television sets without the user having to abandon the comfort of the couch or chair from which the user is viewing the television. Existing hand-held remote control devices, such as "universal" remote control devices, permit the programming and/or control of the user's television and set top box (STB), which may include a digital video recorder (DVR).

DETAILED DESCRIPTION OF THE PREFERRED EMBODIMENTS

The following detailed description refers to the accompanying drawings. The same reference numbers in different drawings may identify the same or similar elements. The following detailed description does not limit the invention.

As described herein, a hand-held TV remote control is provided that includes a display unit that may graphically display TV listing information to the user. The user may, using the graphically displayed TV listing information, select channels for display on the user's television, or may program a set top box to record future TV programs. Alternatively, the user may use another user device, such as, for example, a computer or cell phone, to program the set top box to program future TV programs.

Figure 1:
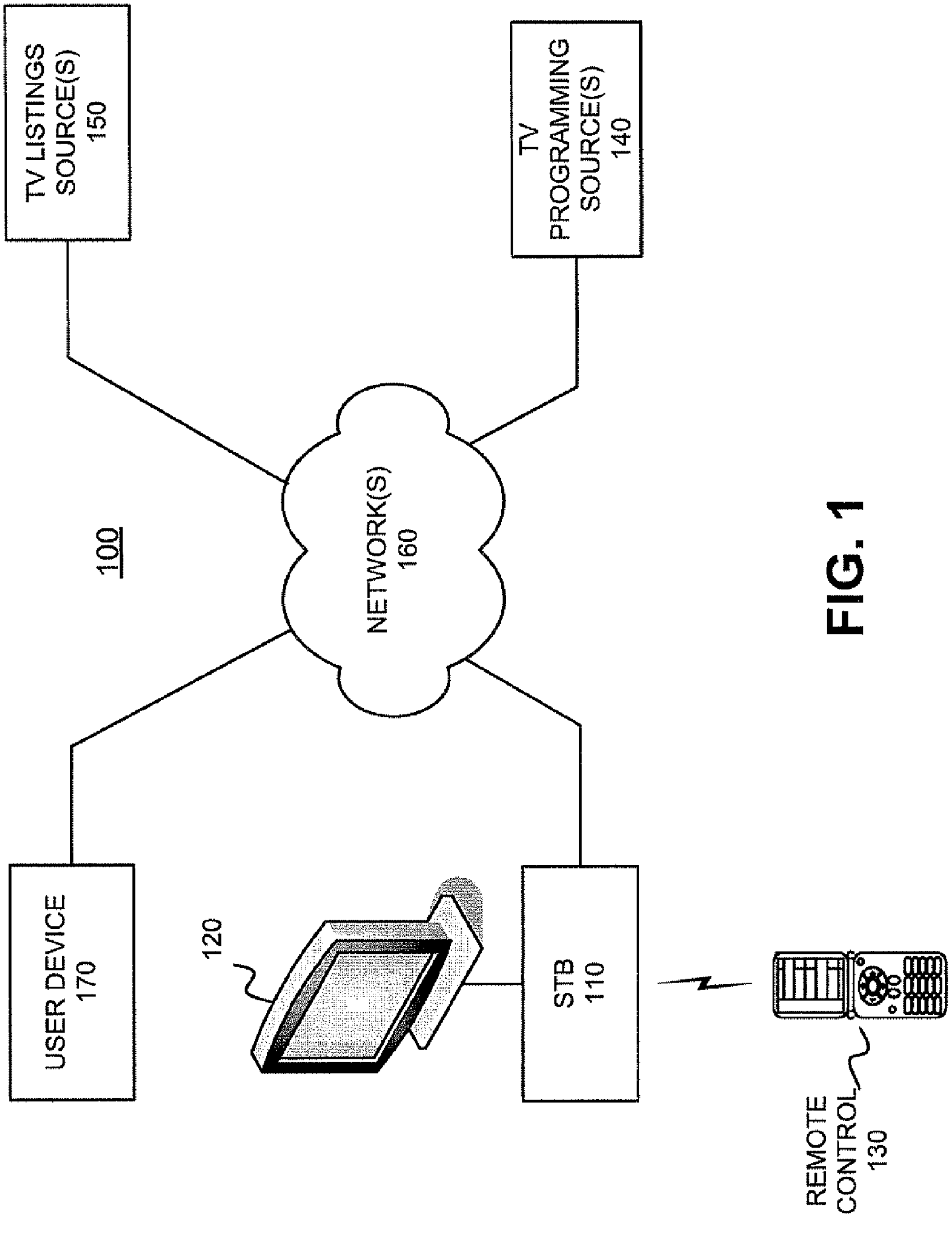
FIG. 1 is a diagram of a network according to an exemplary embodiment.

FIG. 1 is a diagram of a network 100 according to an exemplary implementation. Network 100 may include a set top box (STB) 110, a television (TV) 120, a remote control 130, a TV programming source(s) 140, a TV listings source (s) 150, a network(s) 160 and a user device 170. STB 110, TV programming source(s) 140, TV listings source(s) 150 and user device 170 may connect to network(s) 160 via wired or wireless links.

STB 110 may include a device that connects to a television and some external source of signal and which further turns the signal into content that can be displayed on a screen of the television. The signal may be received via, for example, an ethernet cable, a satellite dish, a coaxial cable (e.g., cable television), a telephone line (including digital subscriber line (DSL) connections), broadband over power line, or a very high frequency (VHF) or ultra high frequency (UHF) antenna. The content may include video, audio, web documents, interactive games, or other types of content. STB 110 may further include a digital video recorder (DVR) that may be programmed to record the content for subsequent user playback.

TV 120 may include any type of device that includes a display for displaying content received from STB 110. Remote control 130 may include functionality for controlling the content provided by STB 110 to TV 120 (e.g., controlling which channel of content is provided to TV 120) and may further include a display unit for displaying a TV listing provided by TV listing source(s) 150. Remote control 130 may further include functionality for enabling a user to select content from the TV listing displayed on the control's display unit that may be provided to TV 120 for display, or which may be recorded by STB 110 for subsequent user playback.

TV programming source(s) 140 may provide TV programming to STB 110 via network(s) 160. For example, TV programming source(s) 140 may include a cable TV provider that provides TV programming via a cable network portion of network(s) 160. As another example, TV programming source(s) 140 may include a satellite TV provider that provides TV programming via a satellite network portion of network(s) 160.

TV listing source(s) 150 may include any source of TV listings that can be provided to STB 110 via network(s) 160. In one implementation, TV listing source(s) 150 and TV programming source(s) 140 may include a same entity, e.g., the TV programming source 140 may also provide a TV listing to STB 110 along with its TV programming. In other implementations, TV listing may be provided by a source that is different than the source of the TV programming. For example, a server associated with a TV listing providing entity may maintain and store TV listing information that can be provided via network(s) 160 to STB 110. The TV listing information may include TV programming and scheduling information. For example, TV listing source(s) 150 may provide TV schedules (e.g., channels, program content and scheduling information) that correspond to the programming provided by a TV programming source 140, which may include a cable TV program source, for a certain geographic region or time zone.

Network(s) 160 may include one or more networks of any type, including a local area network (LAN), a wide area network (WAN), a metropolitan area network (MAN), a telephone network (e.g., the Public Switched Telephone Network (PSTN) or a Public Land Mobile Network (PLMN)), an intranet, the Internet, a cable TV network, a satellite TV network, or a combination of networks. The PLMN(s) may further include a packet-switched sub-network, such as, for example, General Packet Radio Service (GPRS), Cellular Digital Packet Data (CDPD), or Mobile IP sub-network.

User device 170 may include a personal computer, a telephone, a cellular radiotelephone, a Personal Communications System (PCS) terminal, a personal digital assistant (PDA), a laptop computer, a palmtop computer, or another type of appliance that includes a communication transceiver. User device 170 may obtain TV programming from TV programming source(s) 140 or may obtain a TV listing from TV listing source(s) 150.

Figure 2:
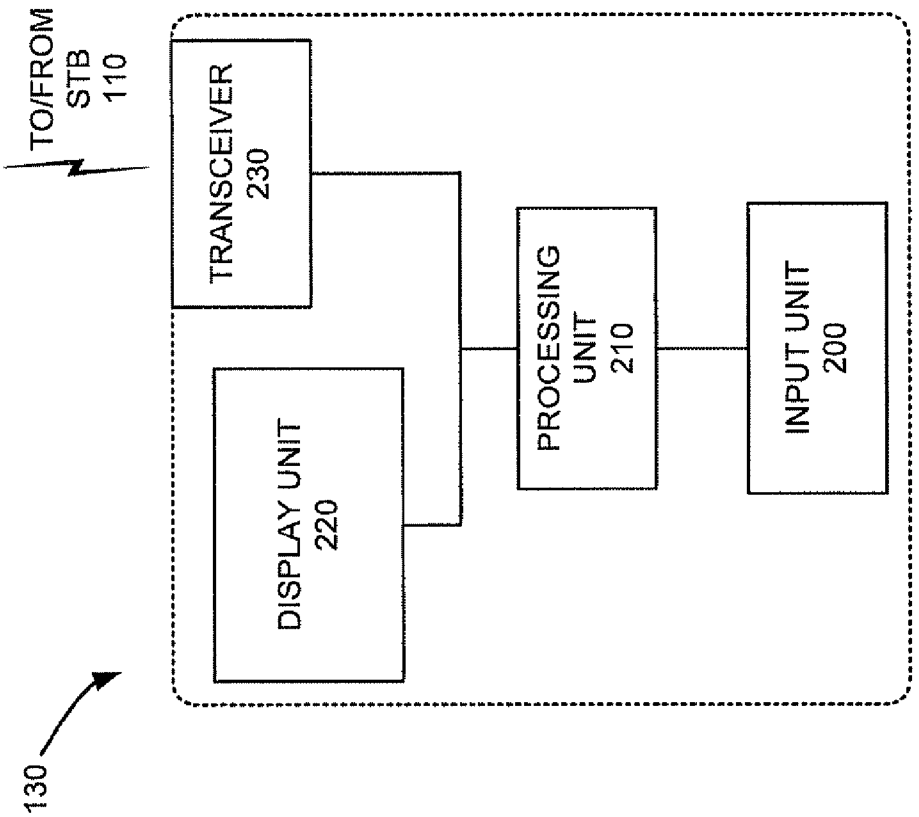
FIG. 2 is a diagram of exemplary components of the remote control of FIG. 1.

FIG. 2 is a diagram of remote control 130 according to an exemplary implementation. Remote control 130 may include an input unit 200, a processing unit 210, a display unit 220 and a transceiver 230. Input unit 200 may include a keypad with keys that may be selected by a user to control remote control 130, or to program STB 110. Processing unit 210 may perform data processing functions for remote control 130 including, for example, receiving input signals from input unit 200, sending data to transceiver 230 for transmission to STB 110, receiving data (e.g., TV listing data) from transceiver 230 transmitted from STB 110 and providing data to display unit 220 for visual display. Processing unit 210 may include a processor, microprocessor, an application specific integrated circuit (ASIC), a field programmable gate array (FPGA), or the like.

Display unit 220 may include, for example, a liquid crystal display (LCD) device or an organic light emitting diode (OLED) device that may display digital data in color. Display unit 220 may display data (e.g., digital TV listing data) received from STB 110 via processing unit 210. Transceiver 230 may include transmitting circuitry for transmitting data to STB 110 (e.g., programming commands) and receiving circuitry for receiving data (e.g., TV listing data) from STB 110. In one implementation, transceiver 230 may include an infra-red transceiver that transmits and received data using infra-red wavelengths. On other implementations, transceiver 230 may include short or long range wireless RF communications transceivers, such as transceivers configured to exchange data using Bluetooth, WiFi (i.e., 802.11x), etc.

Figure 3:
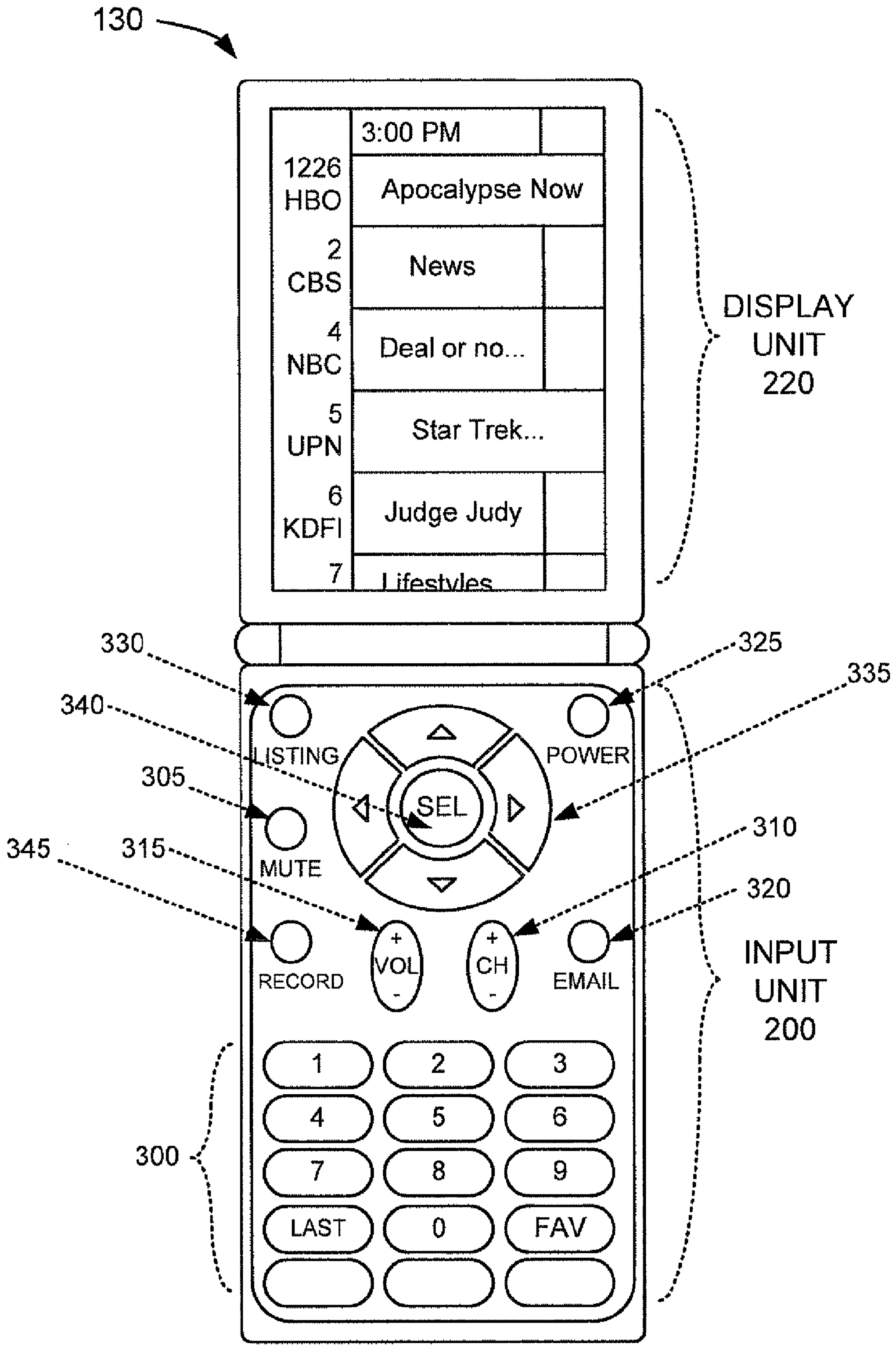
FIG. 3 is an exemplary diagram of the display unit and input unit of FIG. 2.

FIG. 3 is a diagram that depicts input unit 200 and display unit 220 of remote control 130 according to an exemplary implementation. As shown in FIG. 3, input unit 200 may include a keypad that includes various keys, buttons and/or controls for controlling and/or programming STB 110. For example, input unit 200 may include a numeric key pad 300, a mute button 305, a channel key 310, a volume key 315, an email button 320, a power button 325, a TV listing button 330, scroll keys 335, a selection button 340 and a record button 345. Numeric key pad 300 may be used, for example, to enter specific channel numbers. Mute button 305 may be used to mute the volume of the TV programming provided by STB 110 to TV 120. Channel key 310 may be used to control the channel of STB 110 (e.g., increase or decrease the channel). Volume key 315 may be used to increase or decrease the volume of the TV programming provided by STB 110 to TV 120. Email button 320 may be used to send an email regarding selected TV programs (see further details below). Power button 325 may be used to turn STB 110 and/or TV 120 on or off. TV listing button 330 may be used to control STB 110 to provide a TV listing to remote control 130 for display via display unit 220. Scroll keys 335 may be used to scroll through items displayed via display unit 220. Selection button 340 may be used for selecting items scrolled through using scroll keys 335. Record button 345 may be used to initiate the programming of STB 110 to record a user selected TV program. As further shown in FIG. 3, display unit 220 may graphically display the TV listing obtained by STB 110 via TV listing source(s) 150.

Figure 4:
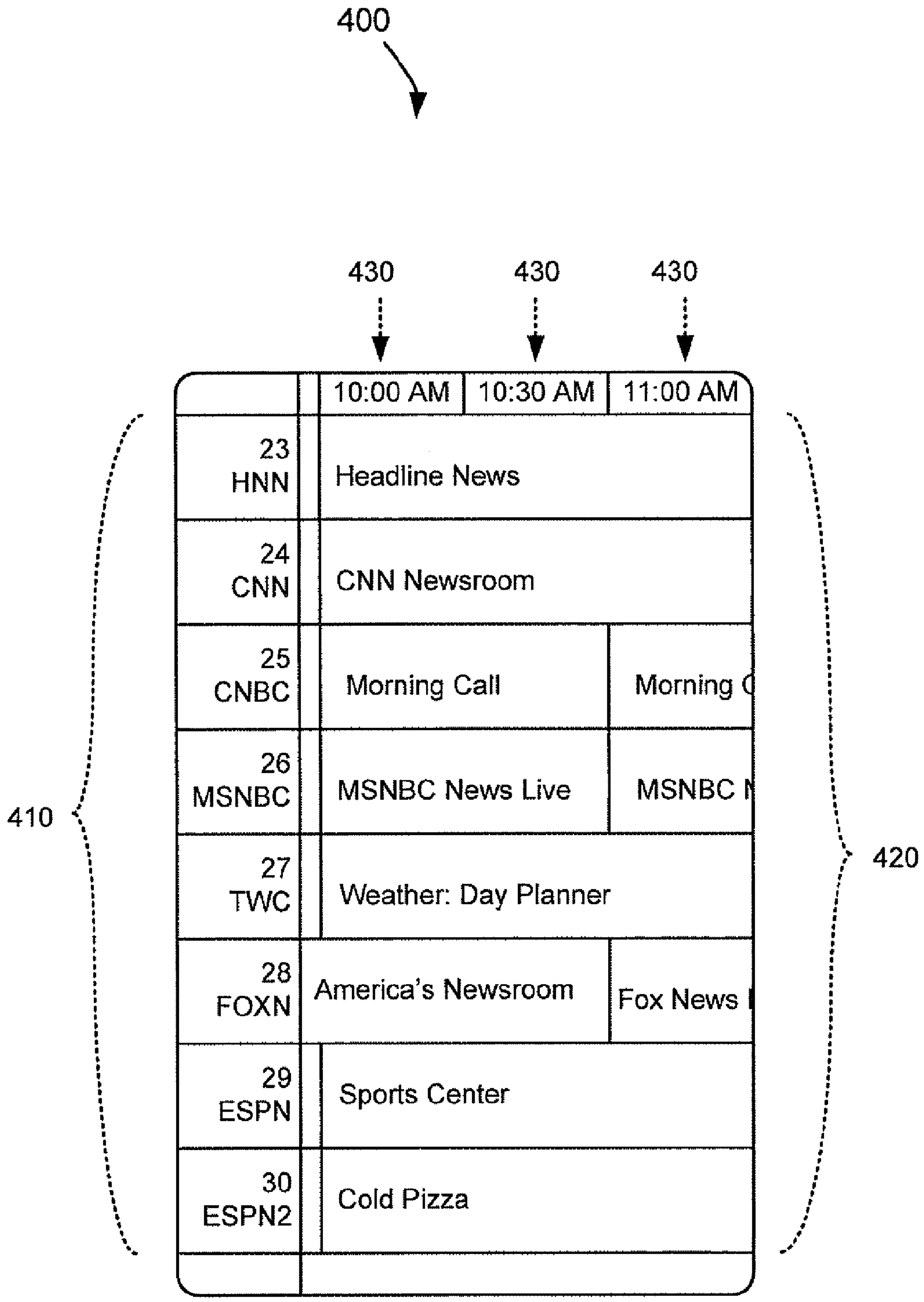
FIG. 4 is an exemplary diagram of a TV listing displayed by the display unit of the remote control of FIG. 3.

FIG. 4 illustrates a graphical display of an exemplary TV listing 400 that may be displayed by display unit 220 of remote control 130. TV listing 400 may include an identification of channels 410, and an identification of the TV programs 420 at specific times 430 for each of the identified channels 410. The graphical display may be scrolled up, down, right or left using, for example, scroll keys 335 (not shown). A specific TV program of the identified TV programs 420 may be selected for viewing using, for example, selection button 340 (not shown).

Figure 5A:
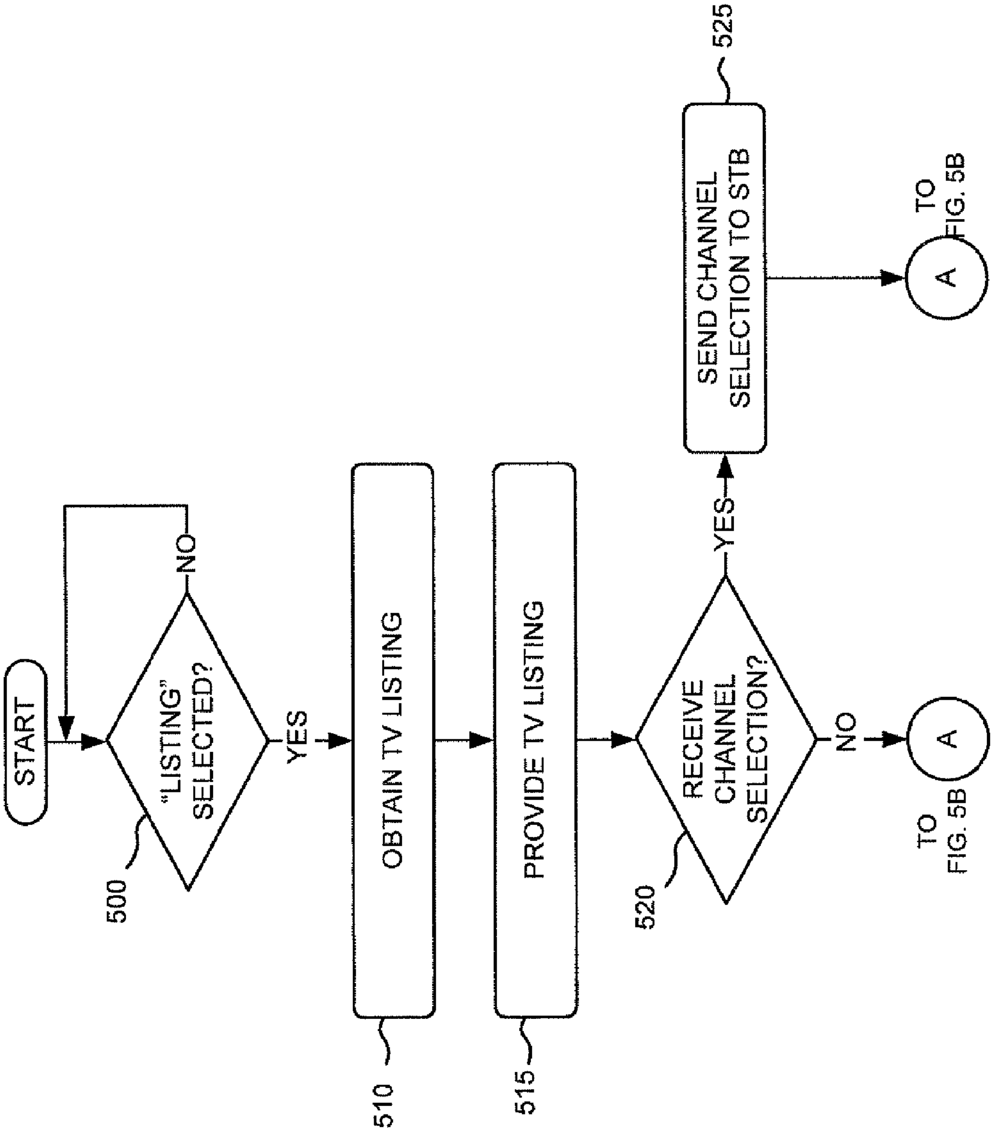
FIGS. 5A, 5B and 5C are flowcharts of an exemplary process for obtaining and displaying a TV listing on a remote control and for receiving user input using the displayed TV listing.
Figure 5B:
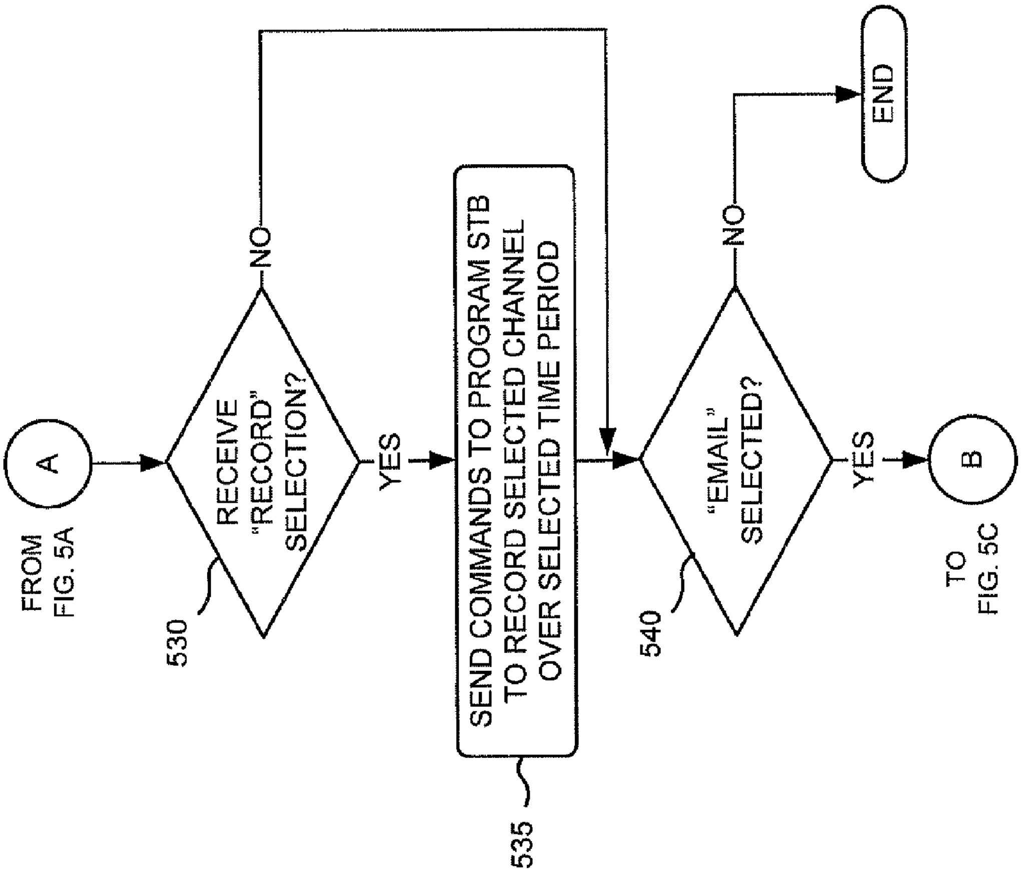
Figure 5C:
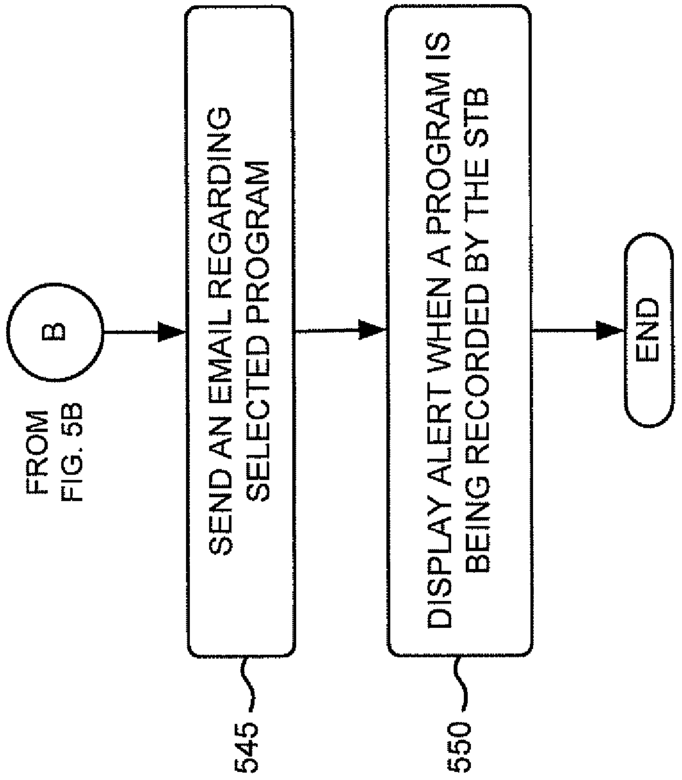

FIGS. 5A, 5B and 5C are flowcharts of an exemplary process for obtaining and displaying a TV listing on remote control 130, and for receiving user input using the displayed TV listing. The exemplary process of FIGS. 5A, 5B and 5C may be implemented by remote control 130.

The exemplary process may begin with a determination of whether "listing" has been selected (block 500). "Listing" may be selected via input unit 200 of remote control 130. For example, a user may depress TV listing button 330 on input unit 200. If "listing" has been selected (YES—block 500), then a TV listing may be obtained (block 510). Remote control 130 may obtain the TV listing via, for example, STB 110. To obtain the TV listing, remote control 130 may transmit a TV listing request via transceiver 230 to STB 110. STB 110 may obtain the TV listing data and transmit the TV listing data to remote control 130. STB 110 may, for example, obtain the TV listing data from TV listings source(s) 150 via network(s) 160.

The obtained TV listing may be provided to the user (block 515). For example, remote control 130 may provide the TV listing via display unit 220. FIG. 4, as described above, is an exemplary diagram of a TV listing 400 displayed via display unit 220 by remote control 130.

A determination may be made whether a channel selection has been received (block 520). The channel selection may be received by remote control 130 via input unit 200. If so (YES—block 520), then the channel selection may be sent to STB 110. To send the channel selection, remote control 130 may transmit an indication of the selected channel to STB 110 via transceiver 230. Channel key 310 of input unit 200 may, for example, be used to select a channel. As another example, scroll keys 335 may be used to scroll through TV listing 400 displayed via display unit 220 and then selection button 340 may be used to select a specific channel.

Figure 6:
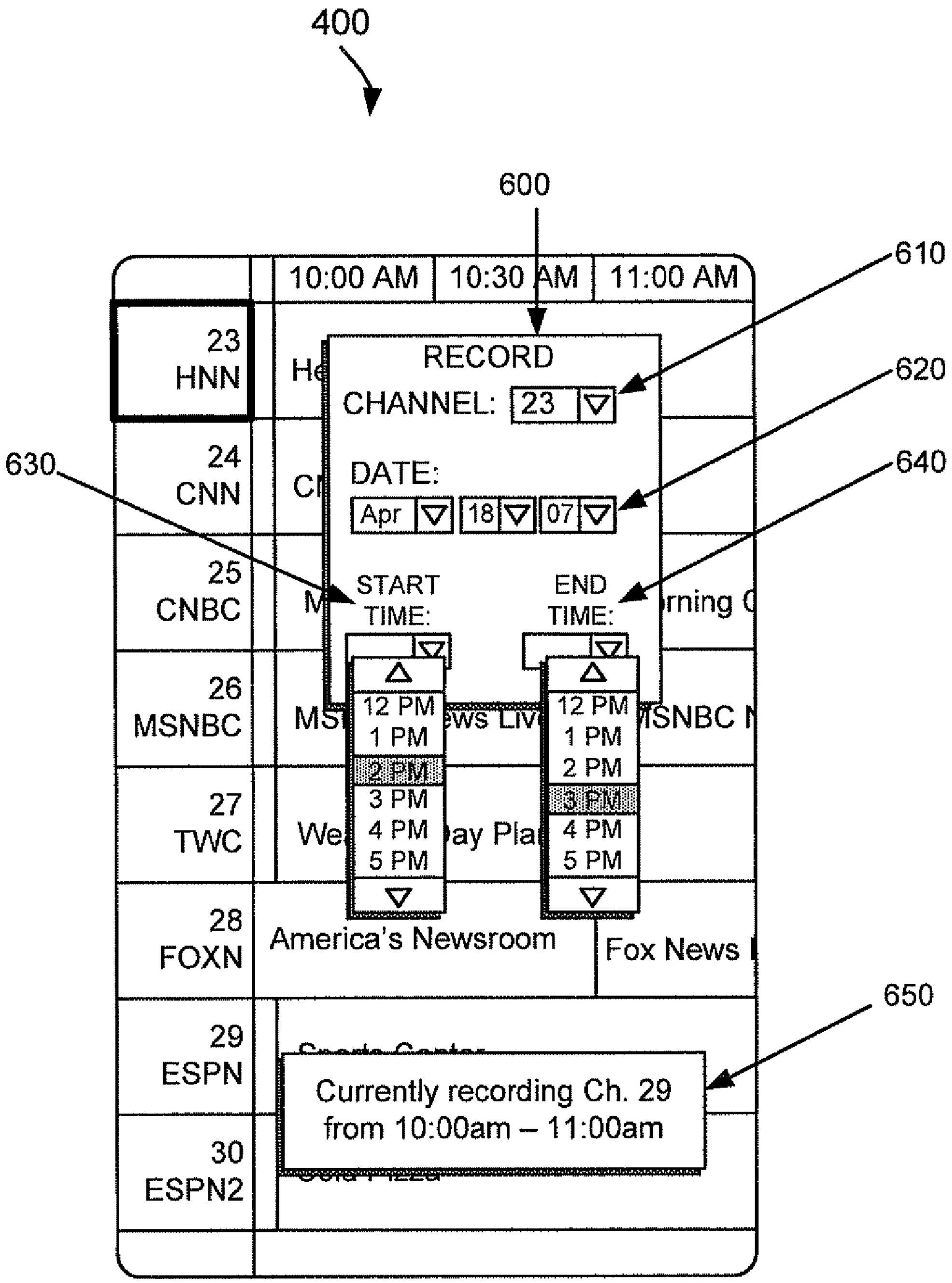
FIG. 6 is an exemplary diagram that depicts selection of program recording, and recording alerts, via a TV listing displayed by the remote control.

A determination may then be made whether "record" has been selected (block 530—FIG. 5B). For example, "record" may be selected via input unit 200 of remote control 130. To select "record," record button 345 of input unit 200 may be depressed by a user in conjunction with the selection of a channel, a date and a recording start and end time. For example, selection of a channel (e.g., using channel key 310, or scroll keys 335 and selection button 340) and selection of record button 345 may, as shown in FIG. 6, result in a "record" window 600 being displayed by display unit 220. The user may then, using scroll keys 335 and selection button 340, select a channel 610 to record, a date 620 that the recording should occur, a start time 630 that the recording should begin and an end time 640 that the recording should end.

Commands to program STB 110 may be sent to STB 110 to record the selected channel over the selected time period (block 535). The user selected recording data may be transmitted by remote control 130, via transceiver 230, to STB 110 to program STB 110 to record the selected channel on the selected date during the selected times. STB 110, using its DVR functionality, may record TV programming in accordance with the recording data transmitted by remote control 130.

A determination may be made whether "email" has been selected (block 540). "Email" may be selected via input unit 200 of remote control 130. To select "email," email button 320 of input unit 200 may be depressed by a user in conjunction with the selection of a TV program via display unit 220.

Figure 7:
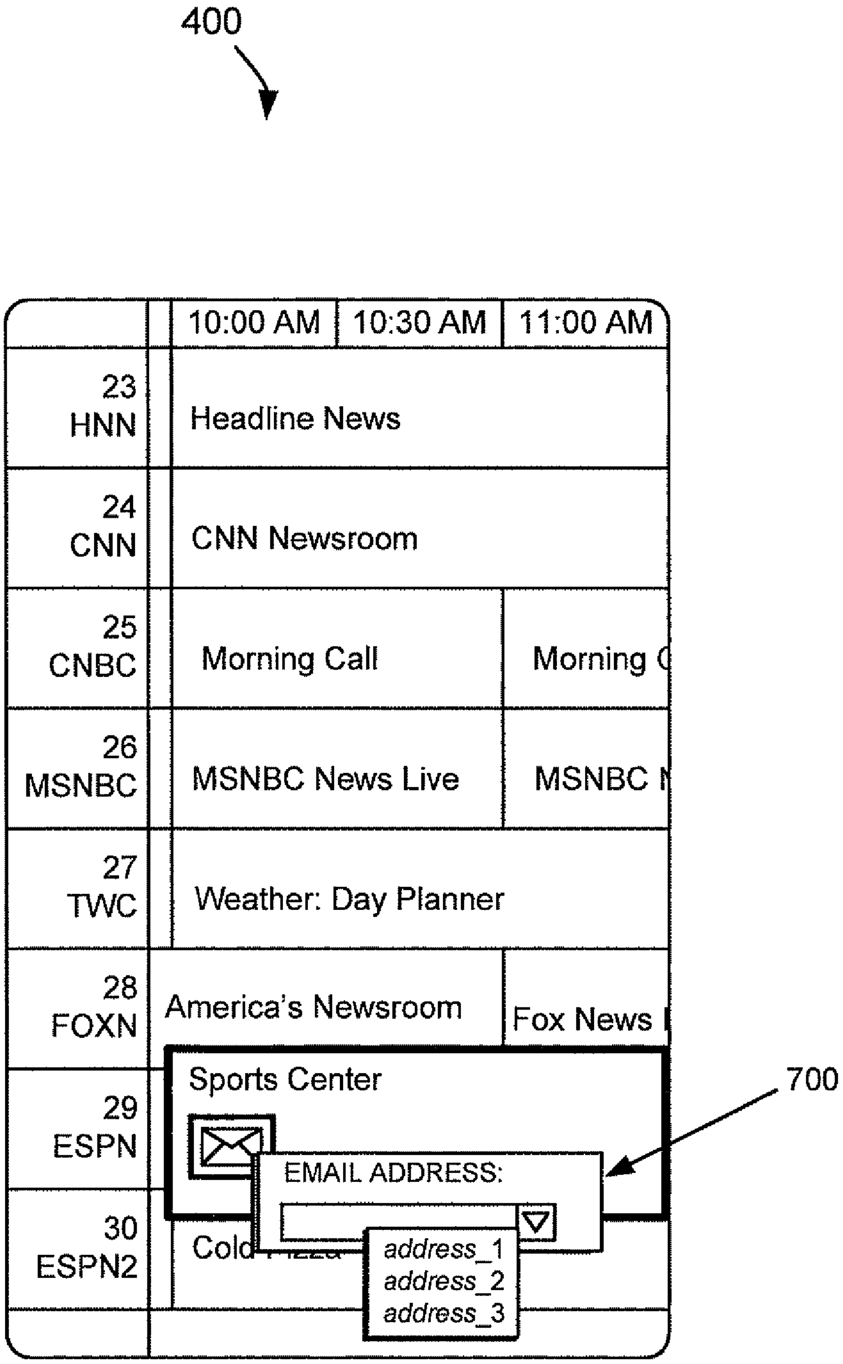
FIG. 7 is an exemplary diagram that depicts a user emailing selected program information using a TV listing displayed by the remote control.

For example, as shown in FIG. 7, a user may use scroll keys 335 and selection button 340 to select a specific TV program via display unit 220 and may then depress email button 320. The user may then, using scroll keys and selection button 340, select an email address from a drop-down menu 700. An email may then be sent regarding the selected TV program (block 545—FIG. 5C). For example, remote control 130 may, via transceiver 230, command STB 110 to send an email regarding the selected TV program. In response to receipt of this command from remote control 130, STB 110 may email a description of the selected TV program, obtained from the TV listing data, to the selected recipient(s) via network(s) 160.

An alert may be displayed when a program is being recorded by STB 110 (block 550). For example, remote control 130 may display an alert via display unit 220 when a TV program is being recorded by STB 110. As shown in FIG. 6, an alert window 650 may be displayed, over TV listing 400, that indicates a channel and a time period over which the channel is being recorded.

Figure 8:
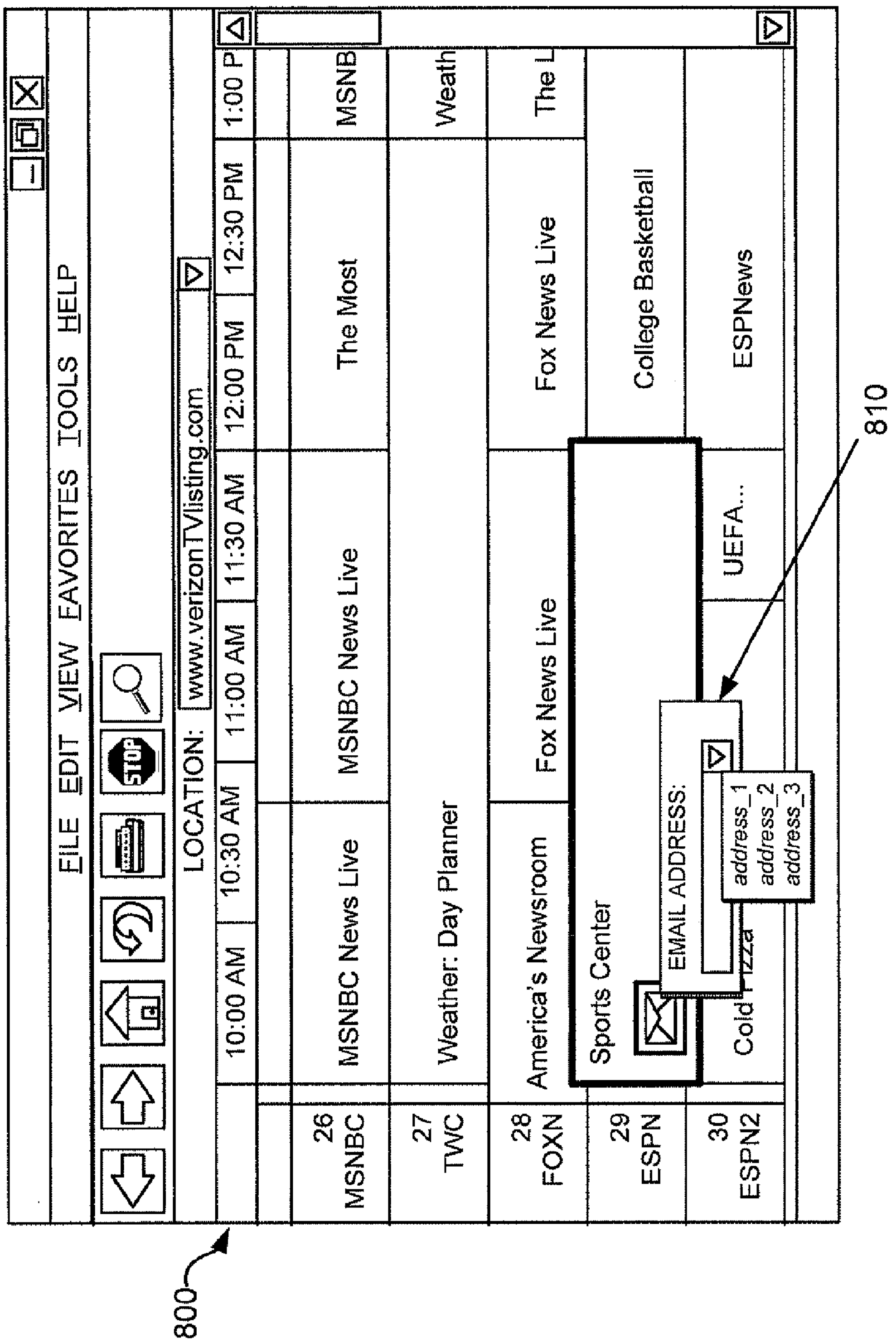
FIG. 8 is an exemplary diagram of a user emailing selected program information using a TV listing accessed via a user device other than the remote control.

FIGS. 5A, 5B and 5C have been described above as being implemented by remote control 130. In other implementations, however, user device 170 may implement the exemplary process shown in FIGS. 5A, 5B and 5C. In such implementations, user device 170 may contact STB 110 or TV listings source(s) 150 via network(s) 160 to obtain TV listings, and may then program STB 110 to record selected TV programming. Alternatively, user device 170 may send emails regarding selected TV programs. For example, as shown in FIG. 8, user device 170 may, using, for example, a web browser, obtain and display a TV listing 800 from STB 110 or TV listings source(s) 150. The user may then program STB 110, via the web browser, to record selected TV programming. The user may also send emails regarding selected TV programming. As shown in FIG. 8, the user may select a specific TV program, and may select destination email addresses via a drop-down menu 810, to email an alert regarding the TV program to the destination email addresses.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense. Modifications and variations are possible in light of the specification, or may be acquired from practice of the invention. For example, while a series of blocks has been described with regard to FIGS. 5A, 5B and 5C, the order of the blocks may be modified in other implementations consistent with the principles of the invention. Further, non-dependent blocks may be performed in parallel. Implementations have been described in which a STB 110 may be programmed, via remote control 130 or user device 170, to select, record or email TV programs. Use of remote control 130 or user device 170 may be restricted to authorized users having established accounts. For example, family members may have individual accounts that may be used to select, record or email TV programs via remote control 130 or user device 170.

It will be apparent that embodiments, as described above, may be implemented in many different forms of software, firmware, and hardware in the implementations illustrated in the figures. The actual software code or specialized control hardware used to implement embodiments is not limiting of the invention. Thus, the operation and behavior of the embodiments have been described without reference to the specific software code, it being understood that software and control hardware may be designed based on the description herein.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A device comprising:
- a processor to:
  - receive commands,
    - the commands including:
      - a channel selection command,
      - a record command, and
      - a transmit TV program information command;
  - transmit a television listing request to a set top box;
  - receive a television listing from the set top box based on the television listing request;
  - transmit recording information, based on the record command, to the set top box to instruct the set top box to record a selected channel,
    - the selected channel being based on the channel selection command;
  - transmit, based on the transmit TV program information command, instructions to the set top box to transmit TV program information to one or more selected recipients; and
  - receive a recording alert from the set top box that indicates that the set top box is currently recording the selected channel; and
- a display unit to:
  - display at least a first portion of the television listing received from the set top box and the recording alert.

2. The device of claim 1, where the commands are received based on user interaction with a plurality of keys of the device.

3. The device of claim 1, where the display unit is further to:
- display at least a second portion of the television listing that includes the selected channel.

4. The device of claim 1, where the recording alert is displayed over the television listing.

5. The device of claim 1, where the recording information includes a date, a start time, and an end time for the selected channel.

6. The device of claim 1, where
- the TV program information is emailed to the one or more selected recipients.

7. The device of claim 1, where the device is a hand-held television remote control device.

8. The device of claim 1, where the device includes a web browser.

9. A method comprising,
- receiving, by a device, commands,
  - the commands including:
    - a channel selection command,
    - a record command, and
    - a transmit TV program information command;
- transmitting, by the device, a television listing request to a set top box;
- receiving, by the device, a television listing from the set top box based on the television listing request;

transmitting, by the device, recording information, based on the record command, to the set top box to instruct the set top box to record a selected channel,
the selected channel being based on the channel selection command;
transmitting, by the device based on the transmit TV program information command, instructions to the set top box to transmit TV program information to one or more selected recipients;
receiving, by the device, a recording alert from the set top box that indicates that the set top box is currently recording the selected channel; and
displaying, by the device, at least a first portion of the television listing received from the set top box and the recording alert.

10. The method of claim 9, further comprising:
displaying, by the device, at least a second portion of the television listing that includes the selected channel.

11. The method of claim 9, where the recording alert is displayed over the television listing.

12. The method of claim 9, where the recording information includes a date, a start time, and an end time for the selected channel.

13. The method of claim 9, where the TV program information is emailed to the one or more selected recipients.

14. The method of claim 9, where the device is a hand-held television remote control device.

15. The method of claim 9, where the device includes a web browser.

16. A non-transitory computer-readable medium storing instructions, the instructions comprising:
one or more instructions which, when executed by a processor, cause the processor to:
receiving, by the processor, receive commands,
the commands including:
a channel selection command,
a record command, and
a transmit TV program information command;
transmit a television listing request to a set top box;
receive a television listing from the set top box based on the television listing request;
transmit recording information, based on the record command, to the set top box to instruct the set top box to record a selected channel,
the selected channel being based on the channel selection command;
transmit, based on the transmit TV program information command, instructions to the set top box to transmit TV program information to one or more selected recipients;
receive a recording alert from the set top box that indicates that the set top box is currently recording the selected channel; and
display at least a first portion of the television listing received from the set top box and the recording alert.

17. The computer-readable medium of claim 16, where the instructions further include:
one or more instructions to display at least a second portion of the television listing that includes the selected channel.

18. The computer-readable medium of claim 16, where the recording alert is displayed over the television listing.

19. The computer-readable medium of claim 16, where the recording information includes a date, a start time, and an end time for the selected channel.

20. The computer-readable medium of claim 16, where the TV program information is emailed to the one or more selected recipients.

* * * * *